(12) United States Patent
Lehto et al.

(10) Patent No.: US 6,823,052 B2
(45) Date of Patent: Nov. 23, 2004

(54) METHOD AND SYSTEM IN AN OVERLOAD SITUATION IN A TELEPHONE EXCHANGE SYSTEM

(75) Inventors: Pekka Lehto, Oulu (FI); Seppo Mäkinen, Kempele (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/095,078

(22) Filed: Mar. 12, 2002

(65) Prior Publication Data

US 2002/0126808 A1 Sep. 12, 2002

Related U.S. Application Data

(63) Continuation of application No. PCT/FI00/00771, filed on Sep. 12, 2000.

(30) Foreign Application Priority Data

Sep. 16, 1999 (FI) .................................................. 991972

(51) Int. Cl.[7] .......................................... H04M 15/00
(52) U.S. Cl. ........................ 379/112.01; 379/112.03; 379/112.04; 379/112.1; 379/221.3; 455/453
(58) Field of Search .................. 379/112.01, 112.03, 379/112.04, 112.05, 112.06, 112.07, 112.08, 112.09, 112.1, 133, 134, 137, 138, 221.03; 455/453; 370/212, 216, 229, 230, 235

(56) References Cited

U.S. PATENT DOCUMENTS

| | | | |
|---|---|---|---|
| 4,007,334 A | * | 2/1977 | McDonald .................. 370/359 |
| 4,629,830 A | * | 12/1986 | Daisenberger ............... 379/138 |
| 5,548,533 A | * | 8/1996 | Gao et al. .................... 709/235 |
| 6,160,875 A | * | 12/2000 | Park et al. ................... 379/133 |
| 6,289,093 B1 | * | 9/2001 | Liinamaa et al. ........... 379/219 |

FOREIGN PATENT DOCUMENTS

| | | |
|---|---|---|
| EP | 891 106 A2 | 1/1999 |
| JP | 10023155 A | 1/1998 |
| WO | 97/35404 | 9/1997 |
| WO | 98/18267 | 4/1998 |
| WO | 98/48582 | 10/1998 |

* cited by examiner

Primary Examiner—Quoc Tran
(74) Attorney, Agent, or Firm—Antonelli, Terry, Stout & Kraus, LLP

(57) ABSTRACT

Method for registering an overload situation in a telephone exchange system comprising a local exchange, an access node, a concentrating interface connecting the access node to the local exchange, a resource manager, which is part of the local exchange and a statistical unit, which is part of the local exchange. The method comprises the steps of scanning the concentrating interface to find a free time slot and detecting by means of the resource manager that the concentrating interface is overloaded. The method further comprises the steps of sending to the statistical unit a message reporting congestion, based on information existing in the resource manager, and recording the congestion situation into a traffic measurement report by means of the statistical unit.

6 Claims, 5 Drawing Sheets

METHOD AND SYSTEM IN AN OVERLOAD SITUATION IN A TELEPHONE EXCHANGE SYSTEM

This application is a continuation of prior application No. pct/F100/00771 filed Sep. 12, 2000.

BACKGROUND OF THE INVENTION

1. Field of the Invention

The present invention relates to telecommunication systems. In particular, the invention concerns a new type of method and system for registering an overload situation.

2. Description of the Prior Art

Open interfaces (V5.1 and V5.2) between an access network and a telephone exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. A dynamic concentrator interface V5.2 defined by the ETS 300 347-1 and 347-2 standards consists of one or more (1-16) PCM (Pulse Code Modulation) lines. One PCM line comprises 32 channels or time slots, each of which has a transfer rate of 64 kbit/s, so the total capacity of the PCM line 2048 kbit/s. The V5.2 interface supports analog telephones as used in the public telephone network, digital, such as ISDN (Integrated Services Digital Network) basic rate and primary rate interfaces as well as other analog or digital terminal equipment based on semi-fixed connections.

The maximum capacity of one V5.2 link is about 500 B-channels. This means that there may be about 500 calls going on at the same time. However, since the V5.2 interface is of a concentrating nature, this number of B-channels is sufficient to serve about 5000 subscribers, depending on the congestion level chosen by the operator. Subscribers may be connected to a local exchange e.g. via a special access node. The access node communicates with the local exchange e.g. via a V5 interface.

Subscribers can be connected to an access node via a wireless local loop system (WLL), in which case it is possible to concentrate subscribers at the interface between the access node and the wireless network. In practice, concentrating here means that not all the subscribers can be simultaneously connected to the access node, the capacity being only sufficient to serve a given number of subscribers.

In addition to actual signalling traffic, the V5 interface specifications include separate Q&M interfaces (O&M, Operation and Maintenance) for a local exchange and an access network. A management interface Q3 for a local exchange is defined in ETSI standards ETS 300 379-1 and ETS 300 377-1. 'Management interface' means an interface between a local exchange and a Telecommunications Management Network (TMN).

The V5 interface comprises two types of time slots: time slots reserved for speech communication, i.e. B-channels, and time slots reserved for signalling, i.e. C-channels. The V5.2 interface additionally comprises backup channels for the backup of the signalling channels. The backup channels normally carry no traffic. If a single 2-Mbit/s transmission link is used, the system automatically allocates time slot 16 for the control protocol. Time slots 16, 15 and 31 may be allocated for the public telephone network and ISDN channels. If there is more than one transmission link, then the system automatically allocates time slot 16 of the primary link for the control protocol, link control protocol, BCC (Bearer Channel Connection) protocol and backup protocol. Time slot 16 of the secondary transmission link is also reserved as a backup channel. The backup mechanism of the V5 interface ensures that a V5.2 interface containing many transmission links will work even after a malfunction has occurred in an individual PCM link. The backup mechanism is used to back up all active C-channels. The speech channels are not covered by the backup protocol. Time slots 1–31 can be reserved for the following purposes:

ISDN and PSTN (PSTN, Public Switched Telephone Network) B-channel, communication channel carrying ISDM D-channel information, PSTN signalling or control data, or communication channel carrying information pertaining to the Control-protocol, Link control protocol, Protection protocol or BCC protocol of the V5 interface.

The V5.2 interface specification includes the Control and PSTN protocols. Some of the functions of the Control protocol are e.g. to provide signalling channels in conjunction with call setup, control the states of subscriber ports and cooperate with the Protection protocol in a situation where a signalling channel connection is broken off. The Protection protocol protects the signalling channels e.g. in the event of a fault in the PCM line. one of the functions of the PSTN protocol is to transmit subscriber line status data to the access node in the case of an analog subscriber. The PSTN protocol additionally functions as a means of communicating with national PSTN specifications. The BCC protocol takes care of allocation and de-allocation of time slots in a concentrating interface. The protocols associated with the V5 interface are described in greater detail in ETSI standard series ETS 300 324 and ETS 300 347.

FIG. 1a presents a system comprising a V5.2 interface as defined in the ETS 300 347 standard series. The system presented in FIG. 1a comprises an access node AN and a local exchange LE. In this example, the access node is connected to the local exchange via a V5.2 interface which comprises links 6–9. The interface could also be V5.1, but in that case there is only one link, i.e. one PCM line between the access node and the local exchange.

The access node AN is provided with a management interface $Q_{AN}$ and the local exchange is provided with a management interface $Q_{LE}$, allowing the local exchange and the access node to be controlled via the management interfaces $Q_{LE}$ and $Q_{AN}$. The interfaces and structures of the management interfaces are defined in the standards mentioned above. The local exchange and the access node are connected to the management interface Q via the management interfaces $Q_{LE}$ and $Q_{AN}$.

When a call is being set up from a local exchange to an access node or vice versa, the local exchange selects the V5.2 interface link to be used and a suitable time slot in that link. The BCC protocol according to the V5 standard gives the access node the link and time slot data so that the call can be set up. In a congestion situation, there may be no resource available for the call in the interface between the access node and the local exchange because of an overload in the interface, in which case the call cannot be set up. In practice, the calling subscriber does not get a dial tone be cause the subscriber cannot be even connected to the access node. This means that all speech time slots in the V5 interface are busy.

ETSI standard ETS 300 379-1, Annex B, comprises a definition to the effect that the indication of traffic measurements concerning the B-channels of the V5 interface is an allocation request between the resource manager and the BCC protocol object. The function of the resource manager is to be aware of which lines are free and which ones are busy. It determines which line is to be used for each call. The resource manager sends to the BCC protocol object an MDUTBCC (allocation request) message. As a response to this message, an MDU-BCC (allocation confirmation) primitive is sent.

However, problems are encountered in a situation where the resource manager finds that there are no resources available for a call and therefore makes no allocation request at all. In this case, there is no attempt to allocate a B-channel for the call, and therefore congestion due to a lack of resources is not recorded in the traffic measurement report. In other words, the above-mentioned standard does not require statistical information to be recorded about a situation where the resource manager of the local exchange detects an overload in the V5.2 interface. In such a case, the BCC protocol is not activated at all. According to the standard, the statistical recording system is only started when the allocation procedure. of the BCC protocol is started.

SUMMARY OF THE INVENTION

The present invention eliminates the drawbacks referred to above or at least significantly alleviates them. A specific aspect of the invention is to add a new property to the V5.2 interface by using a technique whereby the resource-manager's information regarding an overload situation is utilized and a notice about the congestion situation is sent to a statistical unit.

The method of the invention concerns the registration of an overload situation in a telephone exchange system. The system of the invention comprises a local exchange, an access node and a concentrating interface, which may be a V5.2 interface and which connects the access node to the local exchange. The local exchange is preferably a DX200 manufactured by the assignee and the access node is preferably a DAXnode 5000.

In addition, the system comprises a resource manager, which is part of the local exchange, and a statistical unit, which is also part of the local exchange. In the method, the concentrating interface is scanned to find a free time slot therein. The resource manager detects that the concentrating interface is overloaded. This means that there are no free B-channels available for the setup of speech connections. According to the invention, based on information provided by the resource manager, a message reporting congestion is sent to the statistical unit. The message is preferably sent by the resource manager. The congestion situation is recorded in the traffic measurement report by the statistical unit.

The system of the invention sends a message reporting a congestion situation by means of the resource manager to the statistical unit and records a congestion situation in the traffic measurement report by means of the statistical unit.

In accordance with the invention, data indicating an overload situation where no more B-channels are available for allocation is recorded in the traffic measurement report.

BRIEF DESCRIPTION OF THE DRAWINGS

In the following, the invention will be described in detail with reference to embodiments, wherein.

DETAILED DESCRIPTION OF THE PREFERRED EMBODIMENTS OF THE INVENTION

Figure 1A:
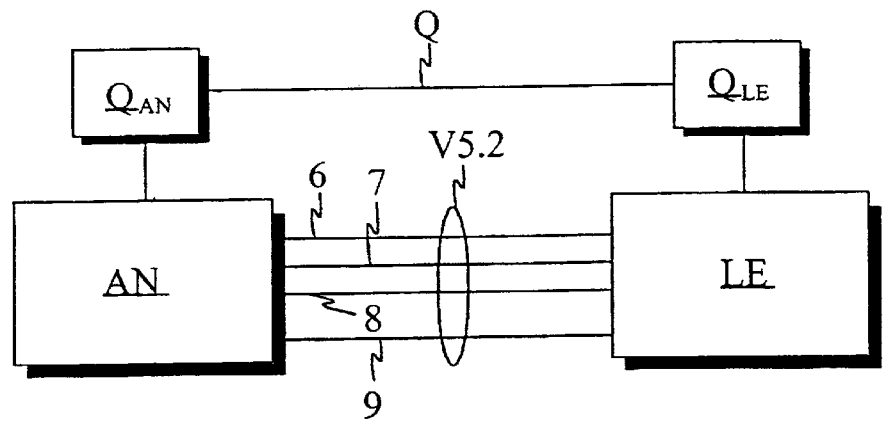
FIG. 1a presents a prior art system which comprises a V5.2 interface consistent with the ETS 300 347 standard series.
Figure 1B:
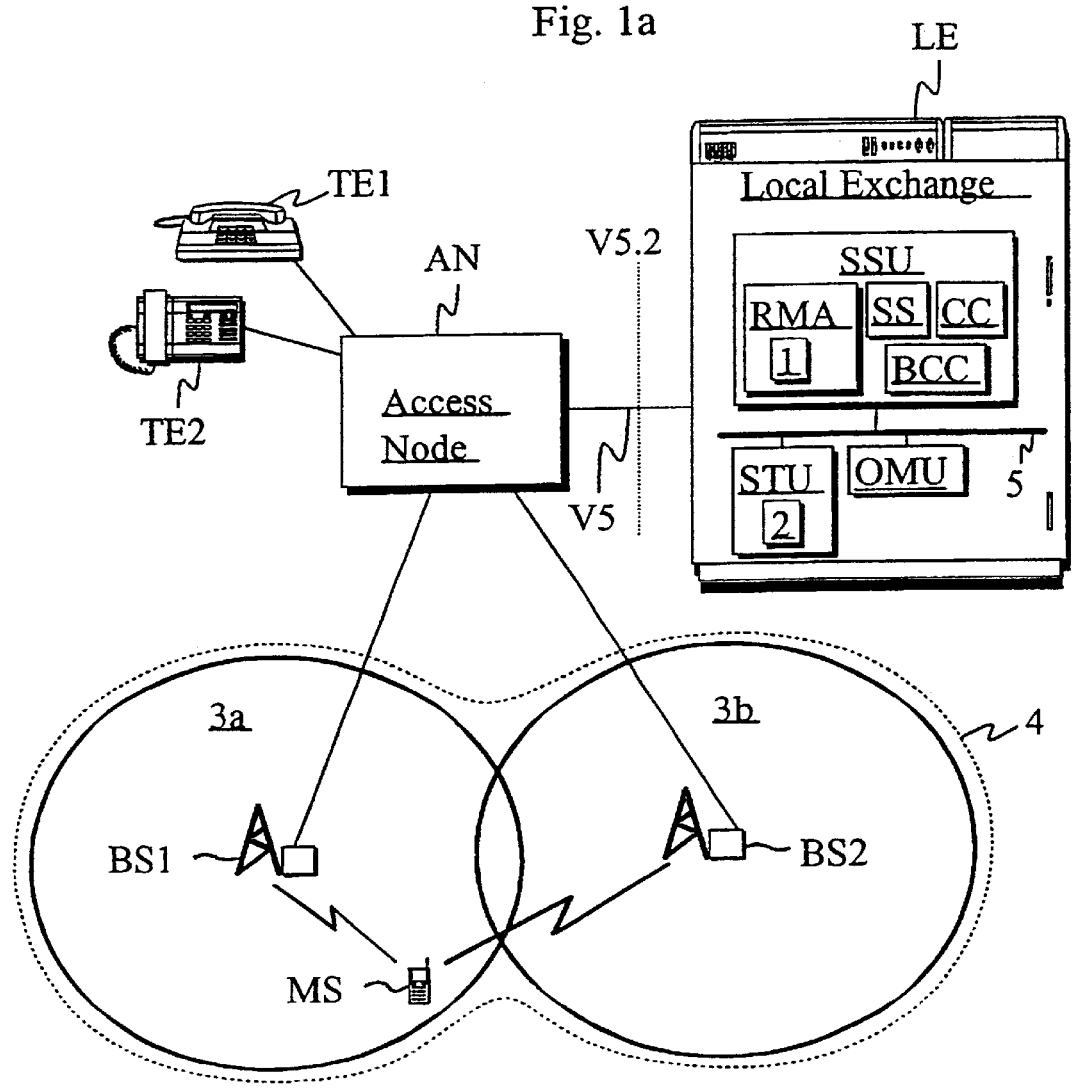
FIG. 1b presents a preferred system according to the invention.

FIG. 1b presents an example of a system in which the present invention can be implemented. The system comprises a local exchange LE and an access node AN connected to the local exchange via a V5 interface. The interface between the local exchange and the access node is a V5.2 interface. The interface V5.2 and its functionality are described in detail in the abovementioned standard ETS 300 347.

Subscribers can be connected to the local exchange LE and to the access node AN in many different ways. FIG. 1b presents a few ways of connection by way of example. Connected directly to the access node are two telecommunication terminals. In this example, terminal TE1 represents an analog telephone and terminal TE2 a digital ISDN telephone.

Also connected to the access node is a wireless local loop system WLL, in which a terminal MS is connected to the access node via the wireless local loop system. The wireless local loop system comprises at least one base station BS, which is connected via an Abis interface to the access node AN. This example comprises two base stations BS1 and BS2, which form cell areas 3a and 3b. The access node controls the operation of the base stations. Together, the cell areas form a mobility area 4, which is the operating range defined for the terminal MS in this example. The access node is connected via a V5 interface to the local exchange, so the terminal MS in the WLL system is seen by the local exchange as a normal wired-network subscriber.

In the system illustrated in FIG. 1b, both the local exchange LE and the access node AN implement the functions required by the BCC protocol. The BCC protocol allocates the resources, e.g. time slots to be used in a call, and also deallocates allocates them in the V5.2 interface. In practice, the BCC protocol thus manages and controls the use of resources in a concentrating V5 interface.

The local exchange LE comprises an internal data bus 5 for data transfer between different units. In this example, three units are connected to the bus:

a subscriber signalling unit SSU, a statistical unit STU and an operation and maintenance unit OMU. There may also be other units connected to the bus. In this example, the subscriber signalling unit SSU comprises four sub-units. These include a resource manager RMA, a signalling section SS, a call control section CC and a BCC protocol section BCC. The above-mentioned units are used for the handling of subscriber signalling.

The management interface of the telephone exchange is implemented via the operation and maintenance unit OMU. A message link is provided from the operation and maintenance unit to the statistical unit STU. The traffic measurements performed in the local exchange LE thus work through the statistical unit. The statistical unit receives information regarding allocation and de-allocation of the lines comprised in the V5 interface and decides whether the event in question needs to be recorded in the traffic measurement report. The traffic measurement report contains information regarding allocation and de-allocation of lines as well as any congestion situations that may have arisen.

The local exchange LE additionally comprises means 1 for sending a congestion message to the statistical unit STU on the basis of information existing in the resource manager RMA and means 2 for recording a congestion situation in the traffic measurement report via the statistical unit.

The subscriber signalling unit SSU, the statistical unit STU and the operation and maintenance unit OMU are preferably implemented as program blocks using a computer.

Figure 2:
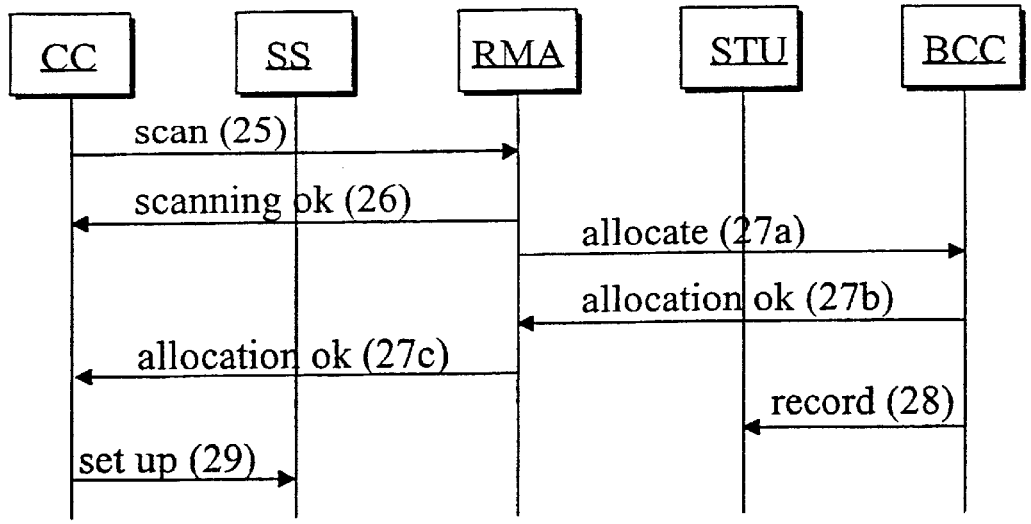
FIG. 2 presents an example of a flow diagram representing the principle of a call setup procedure according to the ETS 300 379-1 standard in which the call is successfully set up and corresponding data is entered in the traffic measurement report.

FIG. 2 presents an example of a flow diagram representing the principle of a prior art call setup procedure according to the ETS 300 379-1 standard, in which a call is successfully set up and data indicating successful setup is entered in the traffic measurement report. The parts comprised in FIG. 2 are call control section CC, signalling section SS, resource manager RMA, statistical unit STU and BCC protocol object BCC.

The call control section CC sends a scan message to the resource manager RMA, arrow 25. The resource manager returns a positive acknowledgement message to the call control section, arrow 26. The resource manager sends a request for allocation of a B-channel to the BCC protocol object BCC, arrow 27a. As there are free B-channels available in this case, the BCC protocol object returns a positive acknowledgement message to the resource manager, arrow 27b. The acknowledgement message is sent further from the resource manager to the call control section, arrow 27c. As an allocation procedure for the allocation of a B-channel according to the BCC protocol has now been started, a request for statistical recording of the event is sent from the BCC protocol object to the statistical unit STU, arrow 28. A B-channel has now been allocated for the setup of a speech connection, so the call control section sends a call setup message to the signalling section SS, arrow 29.

Figure 3:
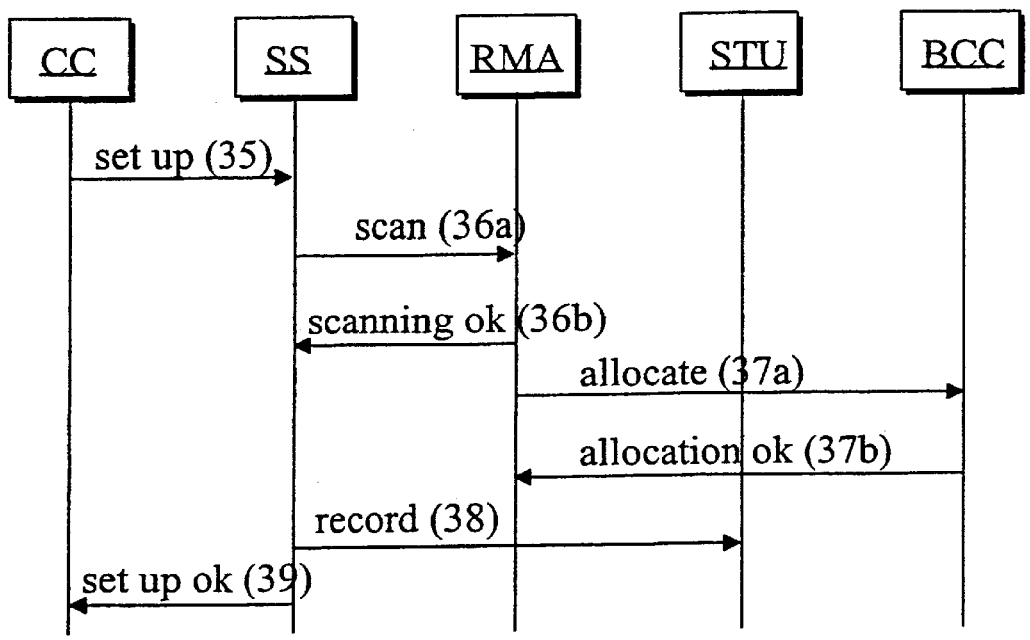
FIG. 3 presents a preferred example of a flow diagram representing the principle of a call setup procedure in which the call is successfully set up and corresponding data is entered in the traffic measurement report.

FIG. 3 presents a preferred example of a flow diagram in accordance with the invention representing the principle of a call setup procedure in which a call is successfully set up and data indicating successful call setup is entered in the traffic measurement report. The parts comprised in FIG. 3 are call control section CC, signalling section SS, resource manager RMA, statistical unit STU and BCC protocol object BCC.

The call control section CC sends a call setup message to the signalling section SS, arrow 35. After this, the signalling section sends a scan message to the resource manager RMA, arrow 36a. The resource manager returns a positive acknowledgement message to the signalling section, arrow 36b. The resource manager sends an allocation request for the allocation of a B-channel to the BCC protocol object BCC, arrow 37a. As there are free B-channels available in this case, the BCC protocol object returns a positive acknowledgement message to the resource manager, arrow 37b. The signalling section sends a request for statistical recording of the event to the statistical unit STU, arrow 38. The signalling section additionally sends a call setup acknowledgement message to the call control section, arrow 39.

Figure 4:
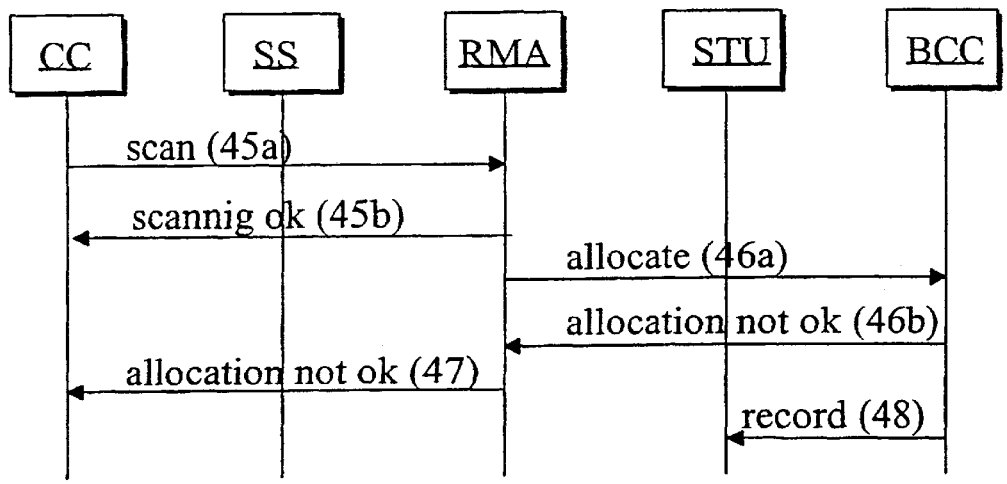
FIG. 4 presents an example of a flow diagram according to the ETS 300 379-1 standard representing the principle of a call setup procedure in which call setup fails because of an internal error situation or congestion in the access node and corresponding data is entered in the traffic measurement report.

FIG. 4 presents an example of a prior art flow diagram according to the ETS 300 379-1 standard representing the principle of a call setup procedure in which call setup fails because of an internal error situation or internal congestion in the access node. The parts comprised in FIG. 4 are call control section CC, signalling section SS, resource manager RMA, statistical unit STU and BCC protocol object BCC.

The call control section CC sends a scan message to the resource manager RMA, arrow 45a. The resource manager responds by returning a positive acknowledgement message to the call control section, arrow 45b. The resource manager sends a B-channel allocation request to the BCC protocol object BCC, arrow 46a. In this case, allocation of a B-channel fails and the BCC protocol object BCC returns a negative acknowledgement message to the resource manager, arrow 46b. The acknowledgement message is sent further from the resource manager to the call control section, arrow 47. The BCC protocol object sends a request for statistical recording of the event to the statistical unit STU, arrow 48.

Figure 5:
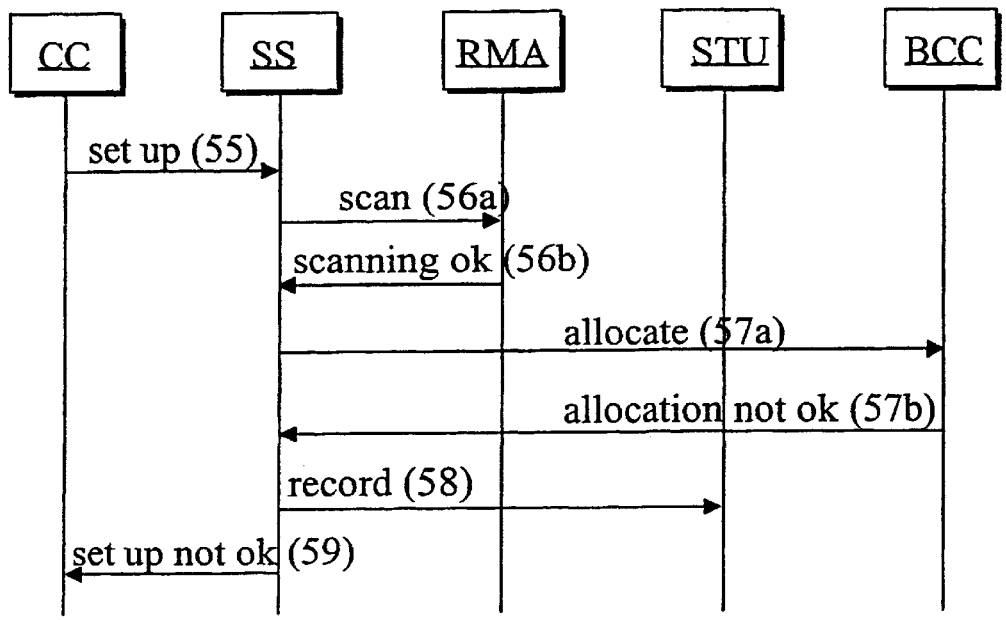
FIG. 5 presents a preferred example of a flow diagram representing the principle of a call setup procedure in which call setup fails because of an internal error situation or internal congestion in the access node and corresponding data is entered in the traffic measurement report.

FIG. 5 presents a preferred example of a flow diagram representing the principle of a call setup procedure in accordance with the invention in which call setup fails because of an internal error situation or internal congestion in the access node and data indicating a failure is entered in the traffic measurement report. The parts comprised in FIG. 5 are call control section CC, signalling section SS, resource manager RMA, statistical unit STU and BCC protocol object BCC.

The call control section CC sends a call setup message to the signalling section SS, arrow 55. Next, the signalling section sends a scan message to the resource manager RMA, arrow 56a. The resource manager returns an acknowledgement message to the signalling section, arrow 56b. The resource manager sends a B-channel allocation request to the BCC protocol object BCC, arrow 57a. As there are no free B-channels available in this case, the BCC protocol object returns a negative acknowledgement message to the resource manager, arrow 57b. The signalling section sends a request for statistical recording of the event to the statistical unit STU, arrow 58. The signalling section additionally sends to the call control section an acknowledgement message indicating failure of call setup, arrow 59.

Figure 6:
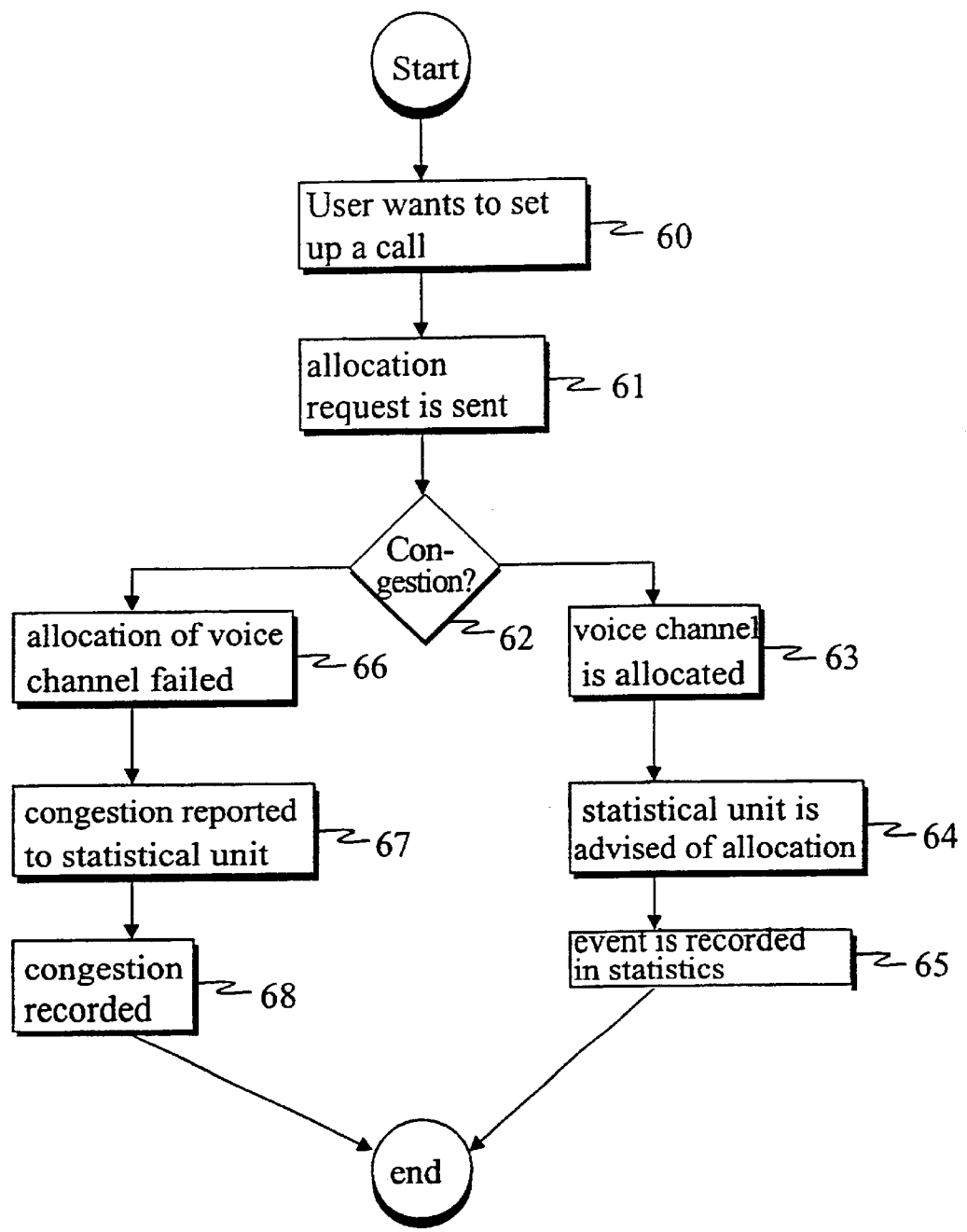
FIG. 6 presents a preferred example of a flow diagram visualizing the procedure of the invention.

FIG. 6 presents a preferred example of a flow diagram visualizing the procedure of the invention. In block 60, a subscriber wants to set up a speech connection. This means, for example, a situation where a subscriber connected to a telephone exchange lifts the receiver of the subscriber's telecommunication terminal in order to set up a call. The resource manager sends a B-channel allocation request to the BCC protocol object. The function of the BCC protocol object is to allocate in the concentrating interface an actual voice channel needed for the speech connection. The concentrating interface is e.g. a V5.2 interface. In block 62, a check is carried out to establish whether it is possible to allocate a speech channel. If B-channel allocation is possible, then the procedure goes on to block 63 and a speech channel is allocated. The statistical unit is informed about the allocation of the speech channel, block 64. In block 65, the statistical unit records successful allocation of a B-channel in the traffic measurement report.

The method and system of the invention provide a solution to the problematic situation where the resource manager finds that the concentrating interface is overloaded. Normally, in such a situation, the BCC protocol object never sends a B-channel allocation request at all. In other words, the allocation request made by the BCC protocol object and the entry made in the traffic measurement report are interdependent in such manner that no traffic recording request is sent if no B-channel allocation request according to the BCC protocol is made. Therefore, a situation arises where no information about a congestion situation is transmitted to the traffic measurement report.

According to the invention, the resource manager finds that the concentrating interface is overloaded. In block 66, it is established that it was not possible to allocate a speech channel. The resource manager sends a traffic measurement request to the statistical unit, block 67. Due to this request, a B-channel allocation request made in a congestion situation is recorded in the traffic measurement report, block 68.

Figure 7:
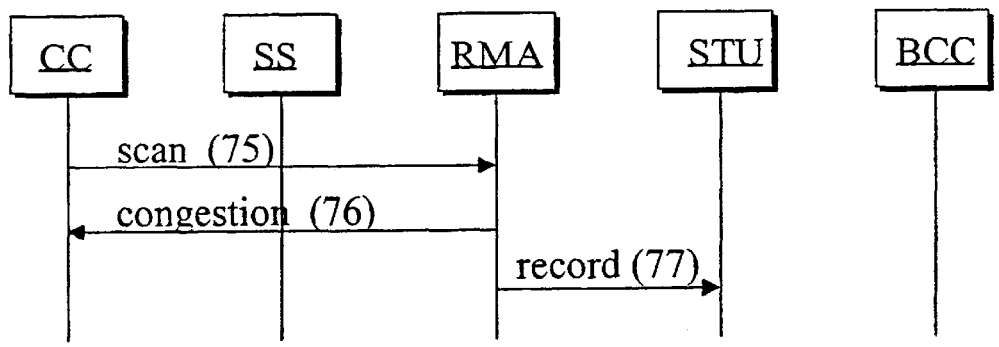
FIG. 7 presents a preferred example of a signalling flow diagram visualizing the procedure of the invention.

FIG. 7 presents a preferred example of a signalling flow diagram visualizing the principle of the procedure of the invention. The parts comprised in FIG. 7 are call control section CC, signalling section SS, resource manager RMA, statistical unit STU and BCC protocol object BCC.

The call control section CC sends a scan request to the resource manager RMA, arrow 75. The purpose of the scan request is to establish whether there are any B-channels available for calls in the concentrating interface. The resource manager knows the number of idle B-channels in the concentrating interface.

In this example, no idle B-channels remain, so the resource manager answers the request by returning a reply reporting congestion, arrow 76. The resource manager sends a message reporting congestion to the statistical unit STU, arrow 77.

Figure 8:
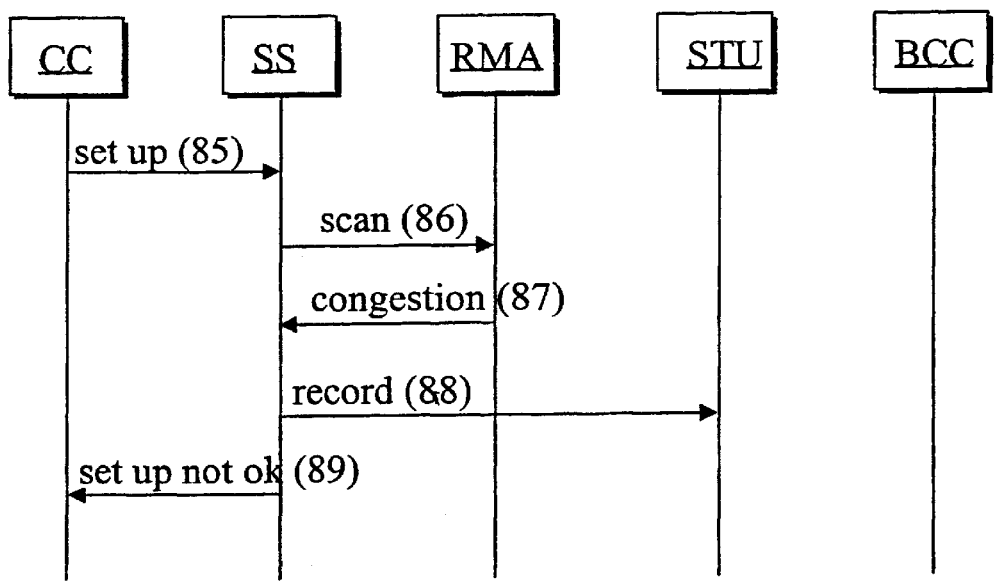
FIG. 8 presents a preferred example of a signalling flow diagram visualizing the procedure of the invention.

FIG. 8 presents a preferred example of a flow diagram representing the principle of the procedure of the invention. The parts included in FIG. 8 are call control section CC, signalling section SS, resource manager RMA, statistical unit STU and BCC protocol object BCC.

The call control section CC sends a call setup message to the signalling section SS, arrow 85. The signalling section sends a scan request to the resource manager RMA, arrow 86. The purpose of the scan request is to establish whether there are any B-channels available for calls in the concentrating interface. The resource manager knows the number of idle B-channels in the concentrating interface. In this example, no idle B-channels remain, so the resource manager answers the request by returning a reply reporting congestion, arrow 87. The signalling section sends a message reporting congestion to the statistical unit STU, arrow 88. After this, the signalling section sends to the call control section a message reporting failure of call setup, arrow 89.

The invention is not restricted to the examples of its embodiments described above; instead, many variations are possible within the scope of the inventive idea defined in the claims.

What is claimed is:

1. A method for registering an overload situation in a telephone exchange system including a local exchange of a fixed telecommunication network, an access node for adapting signaling used by the fixed telecommunication network and signaling used by a wireless telecommunication network to each other, a concentrating interface for concentratingly connecting the access node to the local exchange by multiplexing links between the access node and the local exchange, the links comprising time slots for speech communication and time slots for signaling, a resource manager for monitoring which of the links are busy and which are free, the resource manager being part of the local exchange, and a statistical unit for recording statistical information about the links, the statistical unit being part of the local exchange, the method comprising the steps of:

scanning the concentrating interface to find a free time slot for speech communication;

detecting an overload situation of no free time slot available in the concentrating interface for speech communication by using the resource manager;

sending to the statistical unit a message reporting congestion, based on information existing in the resource manager; and recording the congestion situation into a traffic measurement report by using the statistical unit.

2. A method as defined in claim 1, wherein:

the message reporting congestion is sent to the statistical unit by the resource manager.

3. A method as defined in claim 1, wherein:

the concentrating interface is a V5.2 interface.

4. A method as defined in claim 2, wherein:

the concentrating interface is a V5.2 interface.

5. A system for registering an overload situation in a telephone exchange comprising:

a local exchange of a fixed telecommunication network;

an access node for adapting signaling used by the fixed telecommunication network and signaling used by a wireless telecommunication network to each other;

a concentrating interface, for concentratingly connecting the access node to the local exchange by multiplexing links between the access node and the local exchange, the links comprising time slots for speech communication and time slots for signaling;

a resource manager for monitoring which of the links are busy and which are free, the resource manager being part of the local exchange;

a statistical unit for recording statistical information about the links, the statistical unit being part of the local exchange; and wherein the concentrating interface is scanned to find a free time slot for speech communication;

an overload situation of no free time slot available in the concentrating interface for speech communication is detected by using the resource manager; and the system sends to the statistical unit a message reporting congestion, based on information existing in the resource managers; and records the congestion into a traffic measurement report by use of the statistical unit.

6. A system as defined in claim 5, wherein the concentrating interface is a V5.2 interface.

* * * * *